July 19, 1932.  W. A. MARTIN  1,868,330
CULTIVATOR
Filed Jan. 7, 1932
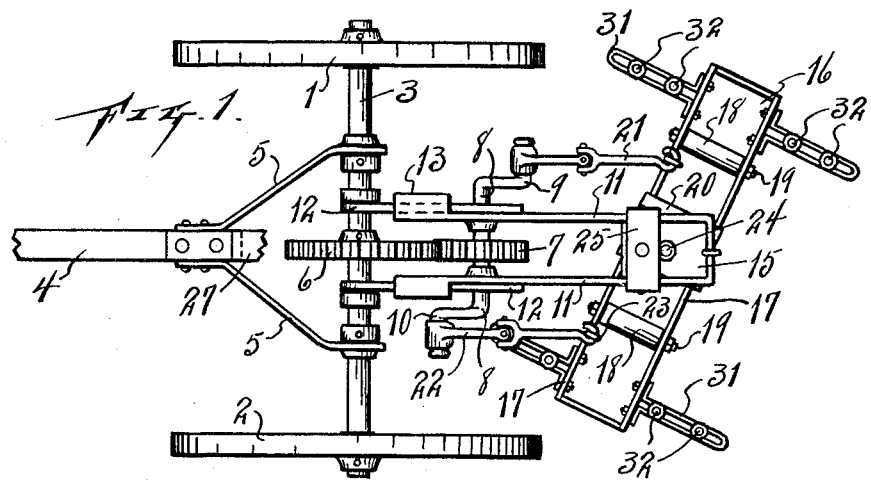
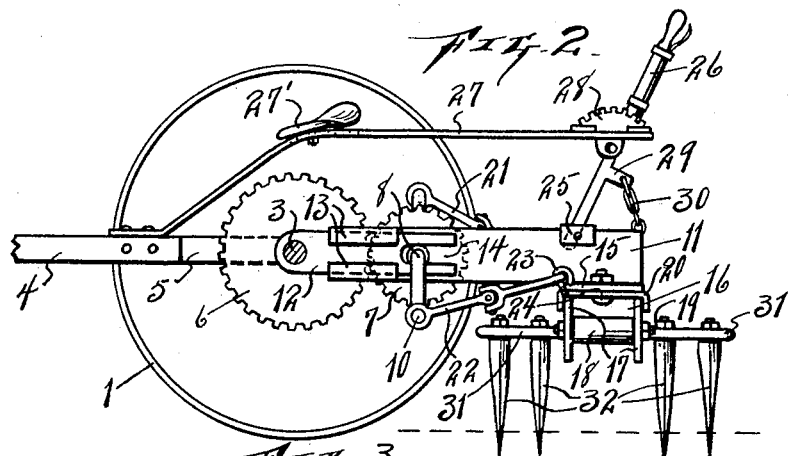
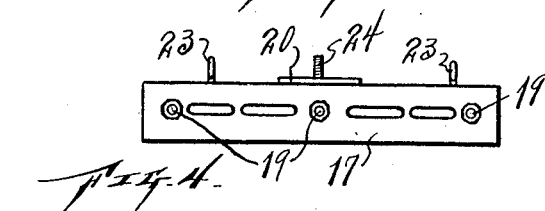
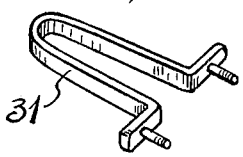
INVENTOR
WM. A. MARTIN
BY
ATTORNEY Patented July 19, 1932

1,868,330

UNITED STATES PATENT OFFICE

WILLIAM A. MARTIN, OF AMARILLO, TEXAS

CULTIVATOR

Application filed January 7, 1932. Serial No. 585,299.

My invention relates to cultivators and more particularly to cultivators which are highly efficient in stirring the ground about small plants; and the object is to provide a cultivator that the ground contacting mechanism is adapted to oscillate horizontally. Another object is to provide a cultivator which can be manufactured at a small cost and which is light and easily operated. Other objects and advantages will be fully explained in the following description and the invention will be more fully pointed out in the claims.

Reference is had to the accompanying drawing which forms a part of this application.

Fig. 1 is a plan view of the cultivator.

Fig. 2 is a side elevation of the same showing one of the tractor wheels removed.

Fig. 3 is a detail view of the horizontal oscillatable bar.

Fig. 4 is a perspective view of one of the yokes for holding the agitators.

Similar characters of reference are used to indicate similar parts throughout the several views.

The invention consists of a wheeled truck which in this instance is provided with tractor wheels 1 and 2 which are provided with an axle 3 rigidly connected thereto. The truck is provided with tongue member 4 which is connected to the axle by means of braces 5 and the braces 5 are provided with collars which ride on the axle 3. A gear wheel 6 is rigidly attached to the axle 3 and driven thereby. The gear wheel 6 is preferably mounted on the axle 3 midway of the tractor wheels 1 and 2. A gear wheel 7 is provided in the cultivator, and this gear wheel is adapted to mesh with and be driven by the gear wheel 6. The gear wheel 7 is provided with an axle 8 which is rigid therewith and the axle 8 is provided with crank arms 9 and 10 on each end thereof. The gear wheel 7 and its axle 8 are positioned relative the gear wheel 6 by means of a sliding frame 11 which serves as a bearing for the axle 8. Arms 12 are yoked to the axle 3 and serve as a support for the frame 11. The frame 11 is provided with telescoping members 13 so that the frame 11 will telescope upon the arms 12. The arms 12 are provided with slots 14 in their ends to permit free movement of the axle 8 during the telescopic movement of the frame member 11. The frame member 11 is made in a U shape and means are provided for manually positioning the frame relative to the arms 12 for engaging and dis-engaging the gear wheels 6 and 7.

The U shaped frame member 11 is provided with a plate 15 on the bottom thereof, adjacent the rear end, for pivotally supporting a horizontally disposed oscillatable member 16. A plate 25 is attached to the top of the frame 11 and above the plate 15 which is provided with a slot or hole for receiving the end of a lever 26.

The oscillatable member 16 consists of side members 17 which are spaced apart by means of pipes 18 which act as braces for the side members 17. Bolts 19 pass through the pipes 18 for holding the side members 17 in spaced relation to each other by means of the spacing pipes 18. A plate 20 is centrally located on top of the frame 16 which acts as a fifth wheel relative to the plate 15. A bolt 24 is passed through the plates 15 and 20 for pivotally connecting the oscillatable frame 16 to the frame 11.

Pitman arms 21 and 22 are journaled to the crank arms 9 and 10 respectively and these arms are provided with universal joints so as to provide flexible means for connecting the arms 9 and 10 with the oscillatable member or frame 16. The pitman arms 21 and 22 are journaled to the member 16 by means of rings 23.

A support 27 is connected to the tongue 4 and extends above the gears 6 and 7 for supporting a rack 28. This support also supports a seat 27'; the seat 27' may be moved backward or forward on the support 27 to balance the weight of the operator with the machine. A lever 26 is pivotally connected to the support and cooperates with the rack 28. The lever is provided with an extension 29 and a chain 30 connected thereto and to the frame 11 for lifting the frame and its cooperating parts as the lever 26 is pushed forward. The lower end of the lever 26 projects into the hole in the plate 25 so that when the lever is pushed forward the frame 11 will be telescoped on the arms 12 so as to dis-engage the gears 6 and 7.

Yokes 31 are adjustably mounted on the sides 17 of the oscillatable member 16 and are adapted to support downwardly extending agitators 32 which scratch the ground when the frame or member 16 is oscillated. The sides 17 of the member 16 are provided with slots for positioning the yokes in various positions relative the central part of the member 16.

What I claim, is,

1. A cultivator comprising a wheeled truck, an axle rigidly connected to said wheels and driven thereby, a tongue journaled to said axle and provided with a rearwardly projecting bar, arms journaled to said axle and projecting rearwardly therefrom, a frame suspended from said bar and telescopically connected to said arms, a frame horizontally disposed and pivotally mounted on said frame, said last named frame being provided with stirring members, and gears driven by said axle for oscillating said last named frame.

2. A cultivator comprising a wheeled truck, an axle connected to said wheels and driven thereby, a tongue journaled to said axle and provided with a rearwardly projecting bar, an adjustable frame journaled to said axle and suspended from said bar, an oscillatable frame pivotally mounted on said frame and provided with stirring members depending therefrom, a gear mounted on said axle and driven thereby, a gear journaled in said adjustable frame and adapted to mesh with and be driven by said first named gear, said gears being adapted to actuate said oscillatable frame, and means for adjusting said adjustable frame for engaging and dis-engaging said gears.

3. A cultivator comprising a wheeled truck, an axle rigidly attached to said wheels and driven thereby, an adjustable frame journaled to said axle and provided with an oscillatable member suspended therefrom, stirring members carried by said oscillatable member, a gear journaled in said frame and adapted to actuate said oscillatable member, a gear mounted on said axle and driven thereby and adapted to drive said first named gear, and means for adjusting said frame for engaging and disengaging said gears.

4. In a cultivator comprising a wheeled truck, an axle rigid with said wheels and driven thereby, a tongue journaled to said axle and provided with a rearwardly projecting bar, arms journaled to said axle and projected rearwardly therefrom, a frame telescopically connected to said arms and suspended from said bar, said frame being provided with an oscillatable member horizontally disposed and pivotally connected thereto, said member being provided with stirring members depending therefrom, a gear journaled in said frame and provided with an axle therefor, said axle being provided with crank arms on each end thereof, flexible link bars pivotally connected to said crank arms and to said oscillatable member for actuating said member, a gear for driving said first named gear rigid with first named axle and driven thereby, and means for telescoping said frame for engaging and dis-engaging said gears.

5. In a cultivator comprising tractor wheels and an axle therefor and driven thereby, a frame journaled to said axle and provided with a horizontally disposed oscillatable member pivotally connected thereto, said member being provided with stirring members depending therefrom, gearing and crank arm connections journaled in said frame and adapted to actuate said oscillatable member, a gear rigid with said axle and driven thereby, said gear being adapted to mesh with and drive said gearing and crank arm connections, and means for engaging and dis-engaging said gears.

In testimony whereof I set my hand this 10th day of December, 1931.

WILLIAM A. MARTIN.